Oct. 21, 1941.  P. S. DENNING  2,259,879
LIGHTWEIGHT MINERAL MATERIAL
Filed Oct. 25, 1937
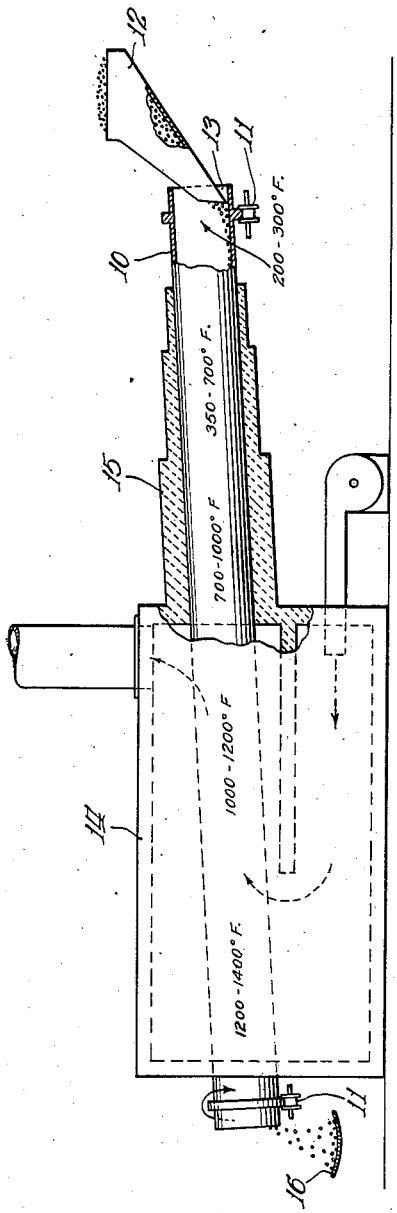
Inventor:
Paul S. Denning
By: Roland C. Rehm
Atty.

Patented Oct. 21, 1941

2,259,879

UNITED STATES PATENT OFFICE 2,259,879

LIGHTWEIGHT MINERAL MATERIAL

Paul S. Denning, Joliet, Ill., assignor to F. E. Schundler & Co., Inc., Joliet, Ill., a corporation of Illinois Application October 25, 1937, Serial No. 170,990

1 Claim. (Cl. 91—70)

This invention relates to lightweight mineral materials, and among other objects aims to reinforce or strengthen fragile lightweight minerals so as to enable them to withstand hard usage such as is encountered in mixing the same as an aggregate in concrete.

The nature of the invention may be readily understood by reference to one illustrative embodiment thereof, described in the following specification and illustrated in the accompanying drawing.

In the drawing the figure represents a diagram illustrating one method of making the material.

Exfoliated vermiculite is one example of a lightweight mineral material whose qualities are substantially impaired when subjected to rough handling such as is encountered in the preparation of lightweight concrete. Exfoliated vermiculite is an alteration product of certain micaceous minerals of the biotite type, which exfoliate or expand to many times their original size upon the application of heat to produce a lightweight granular mineral material which possesses a high insulating efficiency. It comprises numerous highly polished laminae which separate slightly upon exfoliation. It is semi-plastic or compressible in a direction perpendicular to the laminae and tends to split along the cleavage planes when subjected to severe handling. Otherwise its light weight and other qualities make it an ideal aggregate for lightweight concrete.

I have discovered that exfoliated vermiculite, lightweight slag, and other friable or soft lightweight mineral materials may be toughened adequately without objectionable increase in weight or loss of insulating efficiency by an inexpensive treatment which reinforces the exterior or surface of the granules of material. Such toughening is provided in the present instance by forming an insoluble mineral glaze or coating on the granules. In treating exfoliated vemiculite, for example, according to the present process, the granules are mixed with a liquid coating forming material and then dried to cause the liquid to evaporate, thereby effecting a migration of the coating forming material to and concentration thereof on the surface of the granules. Thereupon the granules are heated to temperatures to convert the coating forming material into a hard reinforcing coating or glaze.

Liquid sodium silicate may advantageously be used as a coating material. It is mixed with particles of exfoliated vermiculite to a dough-like consistency during which mixing many free laminae are produced. These later function, as presently explained, to reinforce the granules in conjunction with the glaze. I have found sodium silicate of from 40° to 42° Bé., and having a soda to silica ratio of about 1 to 3¼, quite satisfactory. A relatively high silica content is desired to improve the strength of the glaze. Sodium silicate of this type is similar to that sold on the market as "N" brand by Philadelphia Quartz Co. Thereafter the material is pressed through a screen to subdivide the mass into pellets of a size determined by the screen mesh. This operation and a subsequent tumbling action serves to cover practically the entire surface of the pellets with a coating of laminae initially bonded thereto with the liquid mixed with the material. This treatment also gives the pellets a somewhat special shape.

The pellets are then preferably dried under heat to evaporate water from the sodium silicate, thereby causing the residue to travel to and concentrate at the surface of the pellets. Thereafter the pellets are heated to temperatures of about 1200 to 1400° F. to convert the silicate into an insoluble form which in conjunction with the vermiculite forms a hard coating or glaze which very substantially reinforces the pellets and enables them to withstand rough treatment without crushing or disintegration. Vermiculite thus treated weighs about fifteen pounds per cubic foot.

Very small particles of exfoliated vermiculite which would otherwise have little value may advantageously be used, inasmuch as the sodium silicate initially has a binding action which enables the formation of the larger pellets from individually smaller particles of exfoliated vermiculite. Such smaller particles contain a large number of individual laminae of small size which during the treatment substantially cover the pellets, thereby cooperating with the hardened coating to provide the aforesaid reinforcement.

Other glazing agents referred to in the ceramic trades as "borons," such as salt cake, i. e. sodium sulphate, which flux under heat to form a glaze, may be used in place of sodium silicate.

The drawing illustrates diagrammatically one form of apparatus for drying and heating the granules. It comprises an elongated rotary tube 10 inclined at an angle to cause the pellets to travel downwardly through the same at the proper rate during rotation of the tube. The tube is supported and rotated at the proper inclination by rolls 11.

Before introduction into the tube the material is subdivided (after mixing with the coating liquid) into properly sized pellets, for example, by pressing the same through a screen whose mesh determines the size of the particles. A ¼ mesh screen will form pellets of approximately ¼" size. As thus prepared the pellets are introduced into the upper end of the tube from a chute or hopper 12 discharging into the opening 13. The tumbling action received tends to form the material into roughly spherical pellets. During the drying action relatively low temperatures, i. e. 200 to 400° F. should be maintained. At these temperatures the silicate migrates to the surface of the pellets during the evaporation of the water. Such drying action takes place in the upper portions of the tube. As the dried pellets travel farther down the tube, they encounter increasingly higher temperatures until temperatures from 1200 to 1400° F. are reached. These effect the conversion of the coating or glazing material into the aforesaid hard coating or glaze. Such high temperatures may be produced by a heating chamber 14 surrounding the lower portion of the tube and containing gas or oil burners for developing high temperatures. The tube 10 is preferably metal and the heat is readily conducted through its walls. If the tube be made sufficiently long, such, for example, as about thirty feet, the heat from the lower heating zone may be allowed to travel upwardly through the tube to produce the decreasing temperature gradient which at the upper end of the tube is from 200 to 400° F. The temperature gradient in the upper portion of the tube may be controlled by the amount of insulation 15 surrounding it.

At the lower end of the tube, the treated granules may be discharged upon a conveyer which may include a section 16 of metal belt on which the hot granules are cooled.

If the glazing agent has insufficient temporary bonding power to hold the material against disintegration during the sizing, tumbling and drying operations, it may be supplemented by some organic bonding material such as dextrine or pitch liquor. The latter are, of course, destroyed at the high temperatures reached but are sufficient to carry the material to the fusion zone.

Obviously this invention is not limited to the details of the illustrative embodiment herein described since these may be variously modified. Moreover it is not indispensable that all features of the invention be used conjointly since various features may be used to advantage in different combinations and sub-combinations.

Having described my invention, I claim:

The method of making lightweight mineral aggregate which comprises applying sodium silicate in liquid form to granules of exfoliated vermiculite which alone possess insufficient strength, tumbling the granules to distribute the coating thoroughly over each of the granules and while tumbling the granules heating the same to moderate temperatures to dry the coating, then subjecting the granules while in separated condition to temperatures high enough to convert the coating into a thin insoluble reinforcing glaze around each granule, thereby to produce discrete reinforced granules of light weight.

PAUL S. DENNING.